(12) United States Patent
Hoshiyama

(10) Patent No.: US 11,897,249 B2
(45) Date of Patent: Feb. 13, 2024

(54) VIBRATION GENERATOR AND APPARATUS FOR ENGRAVING AN IMAGE

(71) Applicant: World Venture Corporation, Tokyo (JP)

(72) Inventor: Yuichi Hoshiyama, Tokyo (JP)

(73) Assignee: Sekise Corporation, Tokyo (JP)

( * ) Notice: Subject to any disclaimer, the term of this patent is extended or adjusted under 35 U.S.C. 154(b) by 402 days.

(21) Appl. No.: 17/243,174

(22) Filed: Apr. 28, 2021

(65) Prior Publication Data

US 2021/0347162 A1 Nov. 11, 2021

(30) Foreign Application Priority Data

May 8, 2020 (JP) ................................. 2020-098923

(51) Int. Cl.
*B41C 1/02* (2006.01)
*H02K 35/06* (2006.01)

(52) U.S. Cl.
CPC ............... *B41C 1/02* (2013.01); *H02K 35/06* (2013.01)

(58) Field of Classification Search
None
See application file for complete search history.

(56) References Cited

U.S. PATENT DOCUMENTS 2,860,289 A  11/1958  Verardo

FOREIGN PATENT DOCUMENTS

| JP | H03-119705 A | 5/1991 |  |
|----|--------------|--------|---|
| JP | 2000-263739 A | 9/2000 |  |
| JP | 2004-345017 A | 12/2004 |  |
| JP | 2006-289823 A | 10/2006 |  |
| JP | 2009-207955 A | 9/2009 |  |
| WO | 2009/107381 A1 | 9/2009 |  |
| WO | WO-2016067502 A1 * | 5/2016 | ............... B06B 1/04 |

OTHER PUBLICATIONS

English translation of WO-2016067502-A1. (Year: 2016).*
Indian Office Action dated Jan. 3, 2023 in Indian counterpart patent application No. 202124020164.

* cited by examiner

*Primary Examiner* — Thomas D Lee
(74) *Attorney, Agent, or Firm* — Norris McLaughlin, P.A.

(57) ABSTRACT

The present invention provides a vibration generator capable of accurately adapting to fine vibration. The vibration generator has a stationary permanent magnet, a yoke for the permanent magnet, a coil fixed to the yoke, four springs provided to the yoke, and a movable piece supported with the yoke through the four springs. The end portions of the movable piece are arranged between the respective two pairs of the projections with first gaps. The central portion of the movable piece is arranged in the through-hole with the second gaps, the second gaps having a size to allow oscillation, which is regulated by the first gaps, of the central portion of the movable piece.

7 Claims, 13 Drawing Sheets

| SIGNAL | a | b | a+b | a-b | ENGRAVING |
|---|---|---|---|---|---|
| | 0 | 0 | 0 | 0 | |
| | 1 | 0 | 1 | 1 | |
| | 0 | 1 | 1 | -1 | |
| | 1 | 1 | 2 | 0 | |
| | 0.5 | 0 | 0.5 | 0.5 | |
| | 0.5 | 1 | 1.5 | -0.5 | |
| | 0.5 | 0.5 | 1 | 0 | |

FIG.18

EXPLANATION OF SIGNAL DIAGRAMS

EXPLANATION OF ENGRAVED DIAGRAMS

VIBRATION GENERATOR AND APPARATUS FOR ENGRAVING AN IMAGE

BACKGROUND OF THE INVENTION

1. Field of the Invention

The present invention relates to a vibration generator to output fine vibration and an apparatus for engraving an image on a medium to be engraved using the vibration generator.

2. Description of the Related Art

Conventionally, there is an apparatus for engraving an image on a medium to be engraved, the medium having a booklet shape like a passport, a sheet shape, a card shape or the like. The image engraved prevents falsification or provides an additional aesthetic value. Such an apparatus is disclosed in JP 2006-289823 A or JP 2009-207955 A.

The apparatus vibrates a stylus based on an image signal which is an electric signal converted from image data and performs fine engraving with the vibrating stylus. This forms an image corresponding to a photograph, an illustration or the like on the medium to be engraved.

The apparatus for engraving an image has an electromagnet and a permanent magnet as a vibration generator. The permanent magnet is attached to a base and a movable piece of the electromagnet is vibrated relatively to the permanent magnet to apply the vibration to the stylus. Namely, current is applied to a coil supported with the movable piece in both forward and backward directions to switch magnetic poles of the movable piece. With this, the movable piece on the electromagnet is vibrated relatively to the permanent magnet.

The coil is, however, vibrated as well as the movable piece. The apparatus is, therefore, limited on adapting to fine vibration and is limited on precisely fine engraving and the like.

SUMMARY OF THE INVENTION

An object of the present invention is to provide a vibration generator and an apparatus for engraving an image using the vibration generator, capable of accurately adapting to fine vibration.

In order to accomplish the object, a first aspect of the present invention provides a vibration generator, having a stationary permanent magnet, a yoke for the permanent magnet, a coil fixed to the yoke, four springs provided to the yoke, and a movable piece supported with the yoke through the four springs and configured to vibrate relatively to the yoke according to current applied to the coil in a forward and a backward directions.

The yoke has a pair of yoke bodies with first ends and second ends, a coil fixing portion and four spring supports for the respective four springs, the first ends connected to respective south and north poles of the permanent magnet, the second ends having symmetric two pairs of projections facing each other to form a pair of south and north poles in each pair of the projections, the coil fixing portion into which the coil is accommodated and fixed in the middle between the two pairs of the projections, and springs of the four spring supports, on each side of the coil fixing portion, are symmetrically arranged between the coil fixing portion and a corresponding one of the two pairs of the projections to support respective corresponding springs of the four springs.

The movable piece has a central portion, end portions and an arm, the end portions symmetrically projecting from the central portion and arranged between the respective two pairs of the projections with first gaps, the central portion arranged in the coil fixing portion, and the arm projecting from one of the end portions to output vibration.

The springs have a teardrop sectional shape with a pointed end on a first side and an arc-shaped portion on a second side, the pointed ends of the springs supported with the respective spring supports, and the arc-shaped portions of the springs supporting the movable piece on both sides of the central portion.

The coil in the coil fixing portion having an outer periphery and an inner periphery, the outer periphery fixed to the yoke through resin, the inner periphery having a through-hole in which the central portion of the movable piece is arranged with second gaps, the second gaps having a size to allow oscillation, which is regulated by the first gaps, of the central portion of the movable piece so that the central portion of the movable piece is oscillated and vibrated with the second gaps when the end portions of the movable piece are vibrated with the first gaps according to the current applied to the coil in the forward and the backward directions, thereby to vibrate the movable piece in seesaw operation.

A second aspect of the present invention provides an apparatus for engraving an image having the vibration generator. The apparatus for engraving an image has a stylus to engrave an image, a stylus holder connected to the arm of the vibration generator and holding the stylus, a support spring supporting the stylus holder to allow the stylus holder to be vibrated according to resiliency of the support spring, a table configured to support a medium to be engraved and move in an X-axis direction, a Y-axis direction, and a Z-axis direction relatively to the stylus according to an engraving signal, and a controller configured to control application of the current and relative movement of the table and the stylus.

The vibration generator is set to output the vibration from the arm to vibrate the stylus holder in the Z-axis direction.

The support spring is arranged so as to be extended from a base end to a front end in a lateral direction, the base end fixed to a fixing portion and the front end at which the stylus holder is supported.

The controller applies the current to the coil in the forward and the backward directions according to the engraving signal to vibrate the stylus in the Z-axis direction and causes the relative movement of the table and the vibrating stylus to move the vibrating stylus relatively to the medium supported on the table in the X-axis direction, the Y-axis direction, and the Z-axis direction, thereby to engrave an image on the medium to be engraved.

According to the first aspect, the central portion of the movable piece is allowed to be oscillated and vibrated with the second gaps when the end portions of the movable piece are naturally vibrated with the first gaps according to the current applied in the forward and the backward directions. This allows the movable piece to be more finely vibrated.

According to the second aspect, an image is engraved on the medium according to the relative movement of the stylus and the table in the X-axis direction, the Y-axis direction and the Z-axis direction, the stylus vibrating in the Z-axis direction.

BRIEF DESCRIPTION OF THE DRAWINGS

FIG. 18 is a table illustrating assignment of signals of an adder circuit and a subtraction circuit;

DETAILED DESCRIPTION OF EMBODIMENTS

Figure 1:
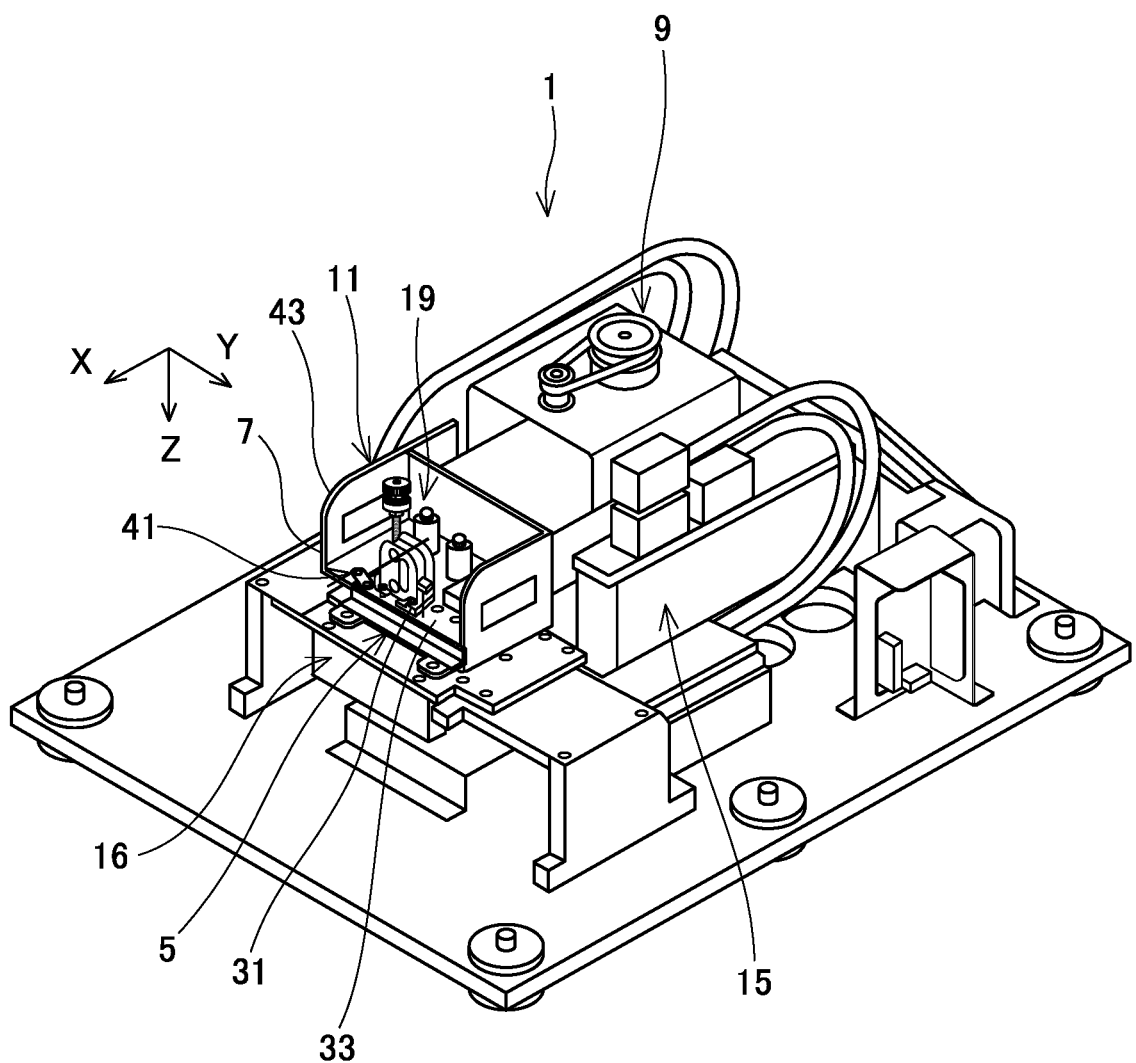
FIG. 1 is a perspective view partly illustrating an apparatus for engraving an image according to a first embodiment of the present invention.

Embodiments according to the present invention will be explained. Each of the embodiments provides a vibration generator and an apparatus for engraving an image using the vibration generator, capable of accurately adapting to fine vibration.

The vibration generator has a stationary permanent magnet, a yoke for the permanent magnet, a coil fixed to the yoke, four springs provided to the yoke, and a movable piece supported with the yoke through the four springs. The movable piece is configured to vibrate relatively to the yoke according to current applied to the coil in a forward and a backward directions.

The yoke has a pair of yoke bodies with first ends and second ends, a coil fixing portion and four spring supports for the respective four springs. The first ends are connected to respective south and north poles of the permanent magnet. The second ends have symmetric two pairs of projections facing each other to form a pair of south and north poles in each pair of the projections. The coil fixing portion accommodates and fixes the coil in the middle between the two pairs of the projections. The springs of the four spring supports, on each side of the coil fixing portion, are symmetrically arranged between the coil fixing portion and a corresponding one of the two pairs of the projections to support respective corresponding springs of the four springs.

The movable piece has a central portion, end portions and an arm. The end portions symmetrically project from the central portion and are arranged between the respective two pairs of the projections with first gaps. The central portion is arranged in the coil fixing portion. The arm projects from one of the end portions to output vibration.

The springs have a teardrop sectional shape with a pointed end on a first side and an arc-shaped portion on a second side. The pointed ends of the springs are supported with the respective spring supports, and the arc-shaped portions of the springs support the movable piece on both sides of the central portion.

The coil in the coil fixing portion has an outer periphery and an inner periphery. The outer periphery is fixed to the yoke through resin, the inner periphery has a through-hole in which the central portion of the movable piece is arranged with second gaps. The second gaps have a size to allow oscillation, which is regulated by the first gaps, of the central portion of the movable piece. With this, the central portion of the movable piece is oscillated and vibrated with the second gaps when the end portions of the movable piece are vibrated with the first gaps according to the current applied to the coil in the forward and the backward directions, thereby to vibrate the movable piece in seesaw operation.

The spring supports are provided on at least four positions so as to be symmetrically arranged. The number of the spring supports may be increased.

The number of the springs my be increased according to the number of the spring supports.

The outer periphery of the coil should be a portion other than the through-hole of the coil and includes an outermost periphery, a peripheral side face and the like.

The size of the second gaps should be set so as to allow the oscillation of the central portion of the movable piece when the end portions of the movable piece vibrate with the first gaps. Namely, the second gaps may have a minimum size or more unless the second gaps restrict the oscillation. The second gaps never become zero at least before the end portions of the movable piece come into contact with the projections of the yoke to make the corresponding respective first gaps become zero. The first and the second gaps may become zero simultaneously.

The vibration generator may have a resin coating forming the inner periphery of the coil to define the through-hole. The resin coating has a planar inner peripheral face and rounded or chamfered edges adjoining to the inner peripheral face to define openings of the through-hole. The rounded or chamfered edges face the arc-shaped portions of the springs. A rounded shape or chamfered shape of the rounded or chamfered edges should allow the arc-shaped portions of the springs to deform within a limited space.

The vibration generator may have a pair of brackets and openings of the pair of brackets. The pair of brackets hold the permanent magnet and the yoke are held therebetween. The openings are formed on the pair of the brackets to face the coil fixing portion. In this case, the coil has side portions projected out from the respective openings of the brackets and is fixed on outer faces of the respective brackets through resin.

An apparatus for engraving an image having the vibration generator has a stylus, a stylus holder, a support spring, a table and a controller. The stylus is to engrave an image. The stylus holder is connected to the arm of the vibration generator and holds the stylus. The support spring supports the stylus holder to allow the stylus holder to be vibrated according to resiliency of the support spring. The table is configured to support a medium to be engraved and move in an X-axis direction, a Y-axis direction, and a Z-axis direction relatively to the stylus according to an engraving signal. The controller is configured to control application of the current and relative movement of the table and the stylus.

The vibration generator is set to output the vibration from the arm to vibrate the stylus holder in the Z-axis direction.

The support spring is arranged so as to be extended from a base end to a front end in a lateral direction, the base end fixed to a fixing portion and the front end at which the stylus holder is supported.

The controller conducts to apply the current to the coil in the forward and the backward directions according to the engraving signal to vibrate the vibrating stylus in the Z-axis direction and causes the relative movement of the table and the vibrating stylus to move the stylus relatively to the medium supported on the table in the X-axis direction, the Y-axis direction, and the Z-axis direction, thereby to engrave an image on the medium to be engraved.

The support spring may have various shapes as long as the support spring allows the stylus holder to vibrate in the Z-axis direction.

A structure for the relative movement of the stylus and the table is optional. Namely, an X-axis, a Y-axis and a Z-axis drivers are employed to move any one or both of the table and the stylus. There are various combinations to move the table and the stylus with the drivers.

For example, the table may be driven by the X-axis driver and the vibration generator may be driven by the Y-axis and the Z-axis drivers to move the stylus in the Y-axis and the Z-axis directions. Alternatively, the table may be driven by the Y-axis driver and the vibration generator may be driven by the X-axis and the Z-axis drivers. Alternatively, the table may be driven by the Z-axis driver and the vibration generator may be driven by the X-axis and the Y-axis drivers.

The apparatus may have an additional vibration generator having the same configuration as the above-mentioned vibration generator. The additional vibration generator is set to output vibration in the X-axis direction.

In this case, the stylus holder is connected to the arm of the additional vibration generator as well as the arm of the vibration generator. The resiliency of the support spring is set to allow the stylus holder to vibrate in the X-axis and the Z-axis directions. The controller conducts to apply the current to the respective coils of the vibration generators in the forward and the backward directions according to the engraving signal to vibrate the stylus in the X-axis and the Z-axis directions and causes the relative movement of the table and the stylus to move the stylus relatively to the medium supported on the table in the X-axis direction, the Y-axis direction, and the Z-axis direction, thereby to engrave an image on the medium to be engraved.

Hereinafter, the embodiments of the present invention will be explained in detail with reference to drawings.

Figure 2:
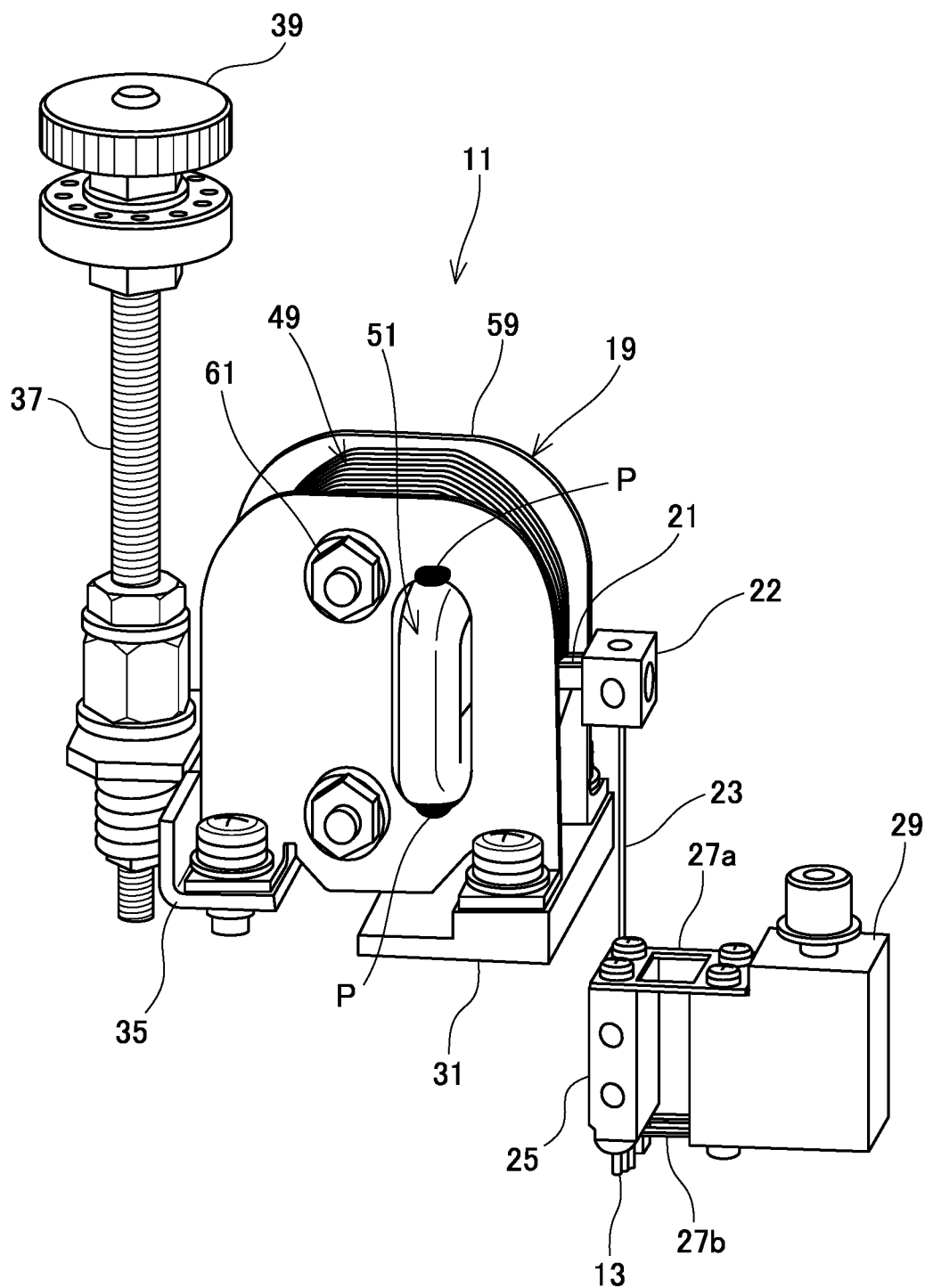
FIG. 2 is a perspective view illustrating a vibration generator and a stylus of the apparatus.

FIG. 1 is a perspective view partly illustrating an apparatus for engraving an image according to the first embodiment of the present invention. FIG. 2 is a perspective view illustrating a vibration generator and a stylus of the apparatus.

As illustrated in FIGS. 1 and 2, an apparatus 1 for engraving an image has a main body (not illustrated) storing a controller and the like. The apparatus 1 is provided with an X-axis table 5, a Y-axis table 7 and a Z-axis drive mechanism 9 and the like on the main body.

The X-axis table 5 serves as a table configured to support a medium to be engraved. According to the embodiment, the medium is put and fixed on the X-axis table 5. The X-axis table 5 is reciprocatingly movable in an X-axis direction in a horizontally extending X-Y plane. The Y-axis table 7 is reciprocatingly movable to move an engraving head 11 in a Y-axis direction in the X-Y plane. The Y-axis direction is orthogonal to the X-axis direction. The Z-axis drive mechanism 9 vertically drives the engraving head 11.

The engraving head 11 includes a stylus 13 and vibrates the stylus 13 according to an input engraving signal. The engraving head 11 moves the stylus 13 relatively to the medium supported on the X-axis table 5 in the X-axis direction, the Y-axis direction, and the Z-axis direction according to relative movement of the X-axis table 5 and the stylus 13 based on the engraving signal, thereby to engrave an image on the medium to be engraved with the stylus 13. The engraving signal is an analogue signal converted from a digital signal of an image read from a picture or the like.

The engraving head 11 is vertically movable by a stepping motor system, a belt drive system, a ball screw system or other driving systems included in the Z-axis drive mechanism 9 as a Z-axis driver arranged behind the engraving head 11. Further, the engraving head 11 is movable in a forward and backward direction as the Y-axis direction by the Y-axis table 7 driven by a Y-axis driver 15 arranged under the Z-axis drive mechanism 9. The Y-axis direction is a row direction in scanning of the medium to be engraved.

The X-axis table 5 is driven by an X-axis driver 16 and is movable in a right and left direction as the X-axis direction. The X-axis direction is a column direction in the scanning of the medium to be engraved. On the X-axis table 5, a medium to be engraved such as passport and card is put and fixed.

In this way, the stylus 13 of the engraving head 11 and the X-axis table 5 on which the medium is supported perform the relative movement in the X-axis direction, the Y-axis direction, and the Z-axis direction.

The apparatus 1 is set to output the vibration from the engraving head 11 in the Z-axis direction. For this, the engraving head 11 is provided with a vibration generator 19. As illustrated in FIG. 2, the vibration generator 19 includes arms 21 through which the vibration is output. A support block 22 is attached to front ends of the arms 21. A stylus holder 25 is connected to the support block 22 through a connecting member 23 in the Z-axis direction. The connecting member 23 is a wire having rigidity to transmit the vibration in the Z-axis direction. The connecting member 23 is made of, for example, metal and elongated in the Z-axis direction. The stylus holder 25, therefore, is connected to the arms 21 through the connecting member 23 in the Z-axis direction.

The stylus holder 25 is supported at front ends of upper and lower support springs 27a and 27b which allow the stylus holder 25 to be vibrated in the Z-axis direction according to resiliency of the support springs 27a and 27b. Each of the support springs 27a and 27b is a plate spring and has a pair of parallel legs arranged apart from each other in the X-axis direction. The support springs 27a and 27b have base ends fixed to a fixing block 29 which is a fixing portion. Namely, the support springs 27a and 27b are arranged so as to be extended from the base end on the fixing block 29 to the front end on the stylus holder 25 in a lateral direction. The stylus holder 25 supports the stylus 13.

The vibration generator 19 has one side fixed to a float plate 33 through a plate spring member 31 and the other side connected to a joint plate 35. The joint plate 35 is connected to an adjustment screw 37 for the stylus 13. The adjustment screw 37 is screwed to the float plate 33 and is rotationally operable by a knob 39 with a scale. The float plate 33 is joined to a frame 43 of the engraving head 11 through a plate spring 41. The fixing block 29 is also fixed to the float plate 33.

The stylus 13, therefore, vibrates in the Z-axis direction in conjunction with vibration due to seesaw operation of a movable piece 55 according to current applied to a coil 51 in a forward and a backward directions based on an engraving signal. The vibrating stylus 13 engraves an image on the medium to be engraved according to the relative movement of the X-axis table 5 and the stylus 13 in the X-axis direction, the Y-axis direction, and the Z-axis direction based on the engraving signal.

Figure 3:
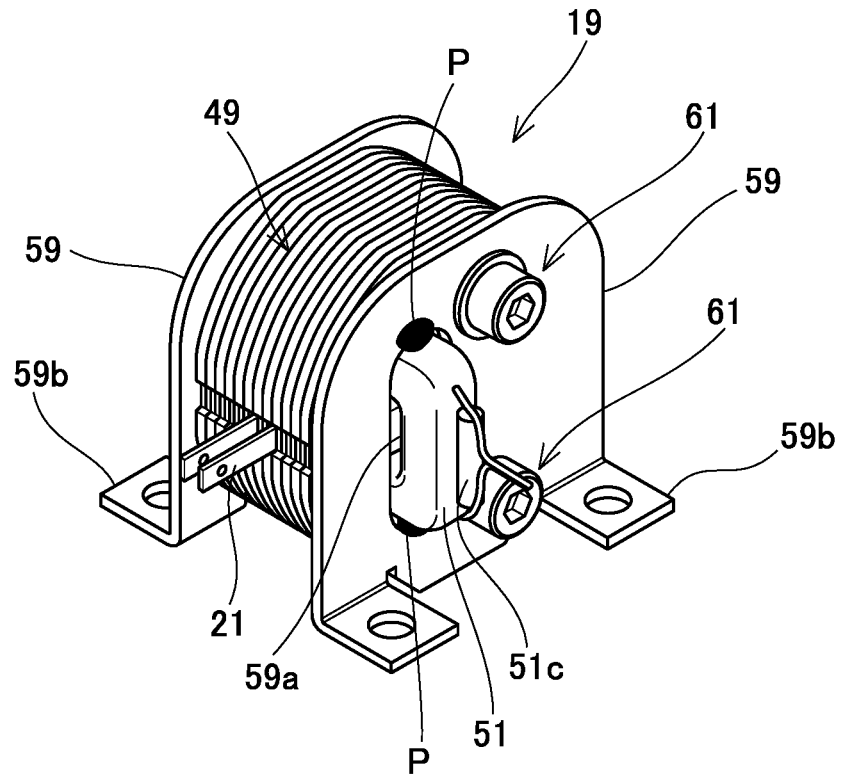
FIG. 3 is a perspective view illustrating the vibration generator.
Figure 4:
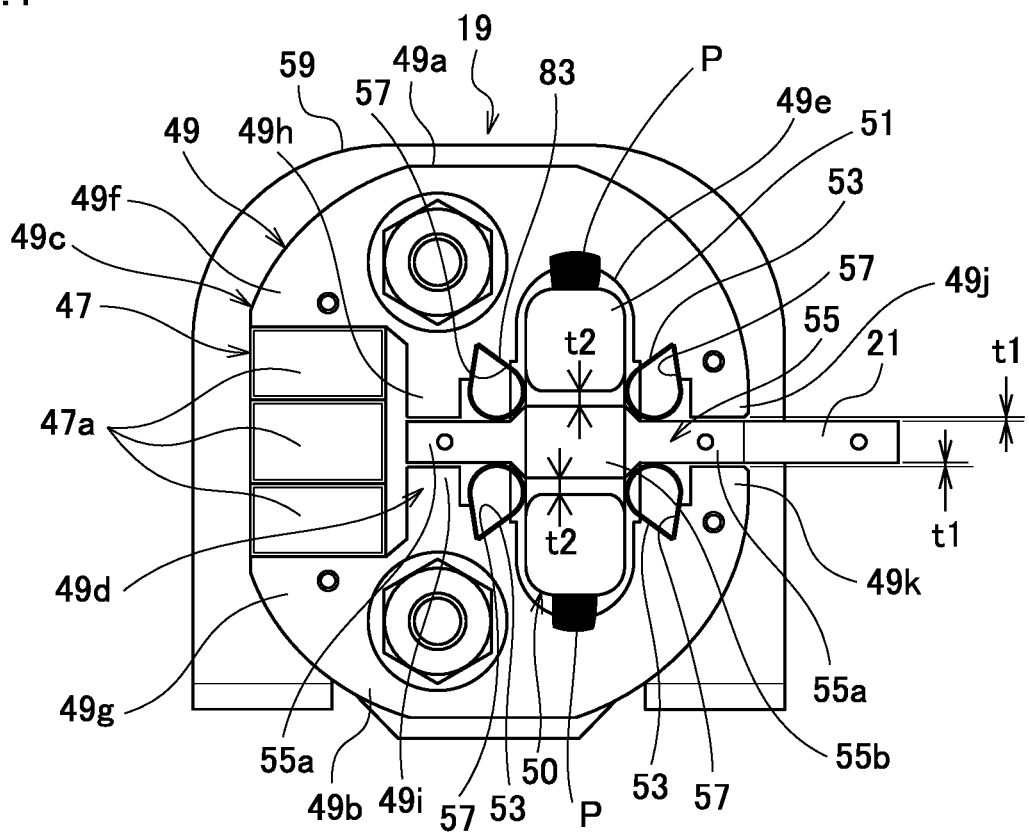
FIG. 4 is a side view of the vibration generator.
Figure 5:
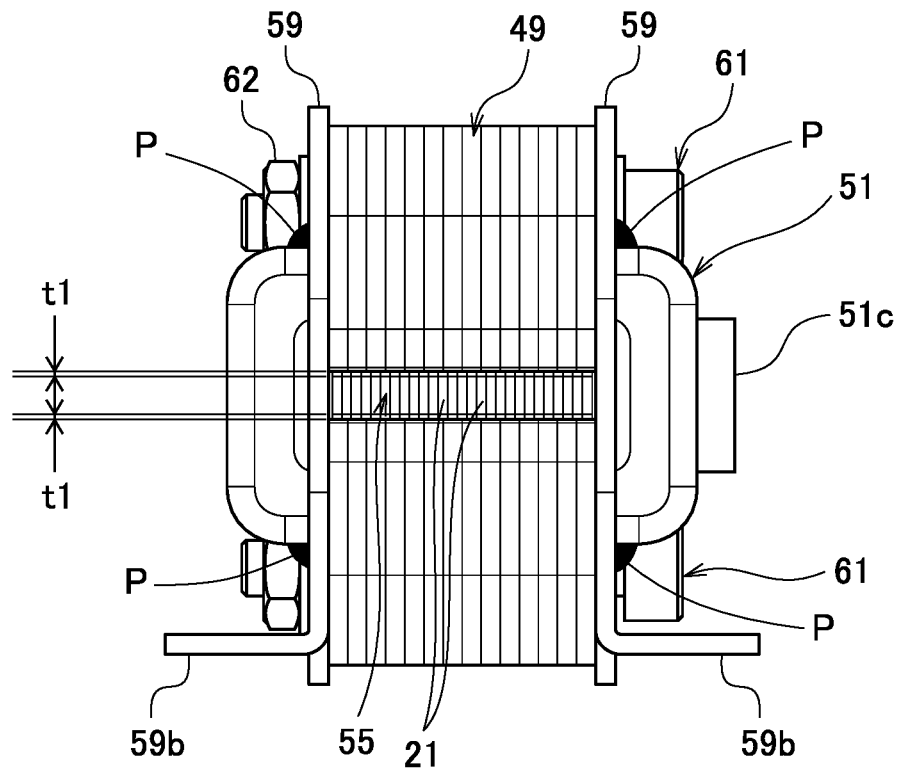
FIG. 5 is a front view of the vibration generator.
Figure 6:
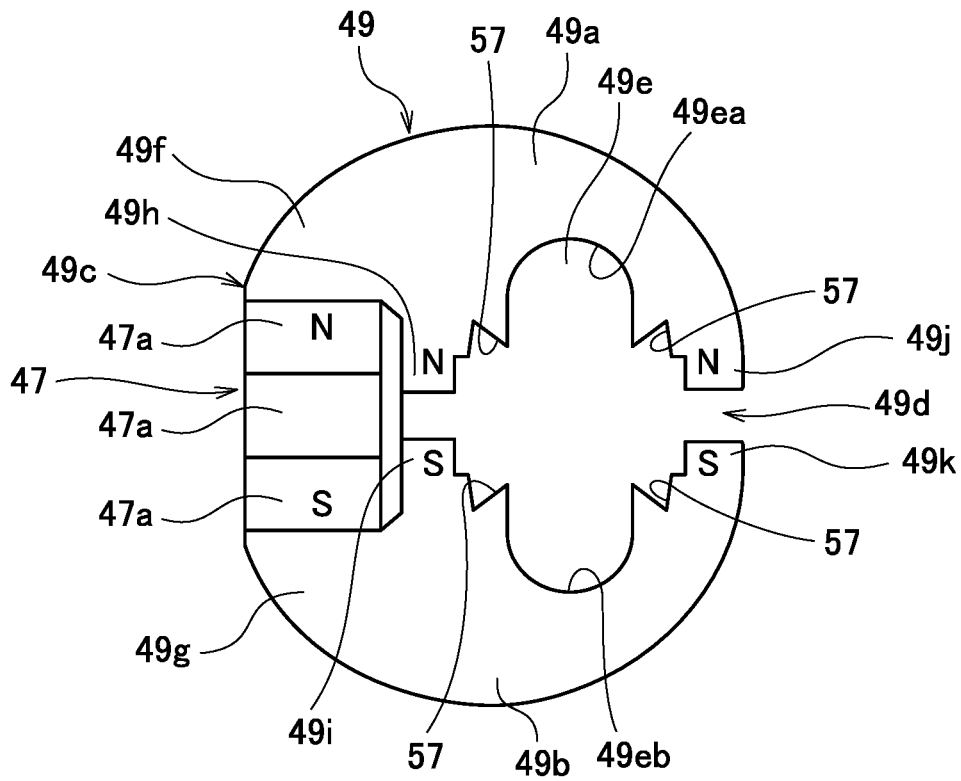
FIG. 6 is a front view of a yoke with an electromagnet of the vibration generator.
Figure 7:
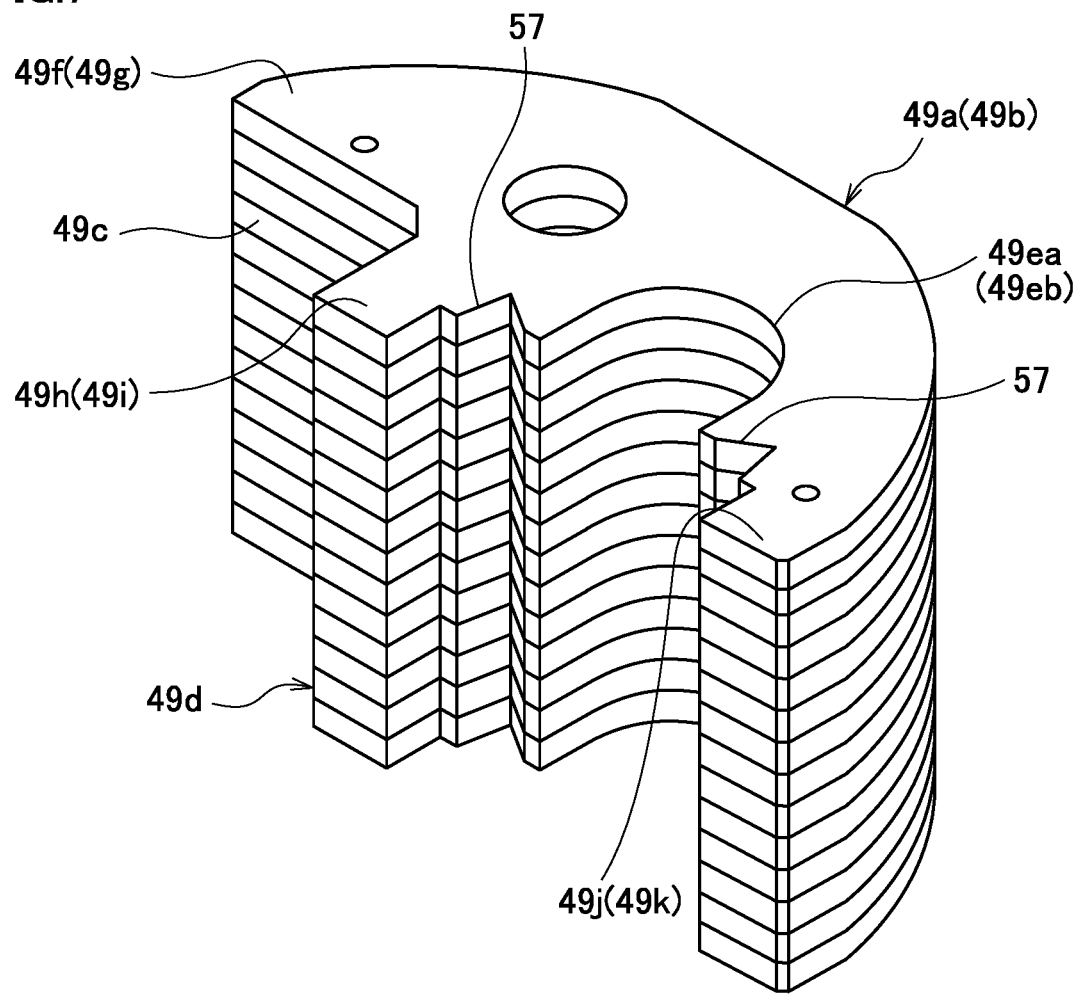
FIG. 7 is a perspective view illustrating a stack of yoke plates of the yoke.
Figure 8:
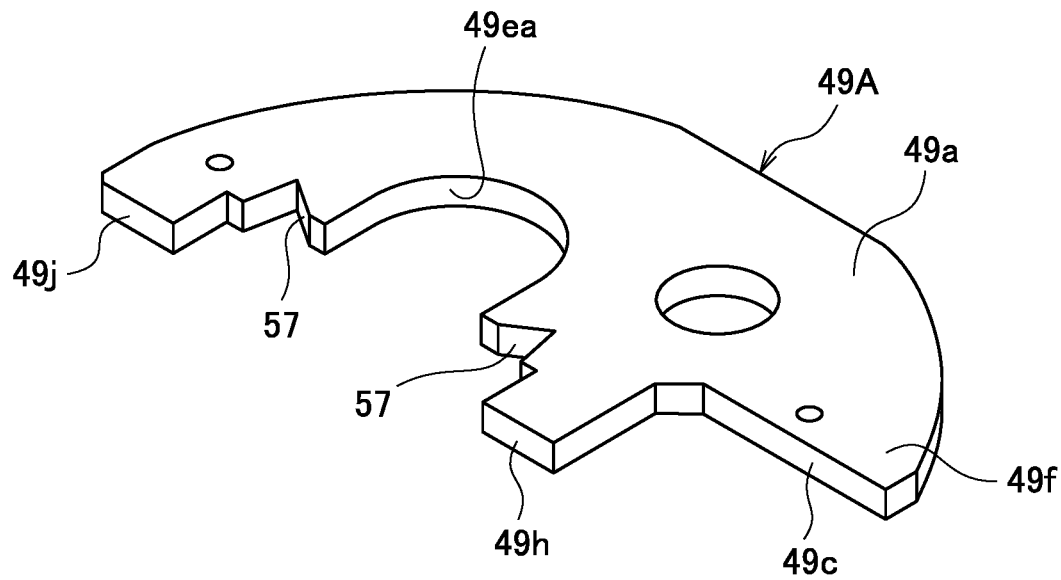
FIG. 8 is a perspective view illustrating a yoke plate.
Figure 9:
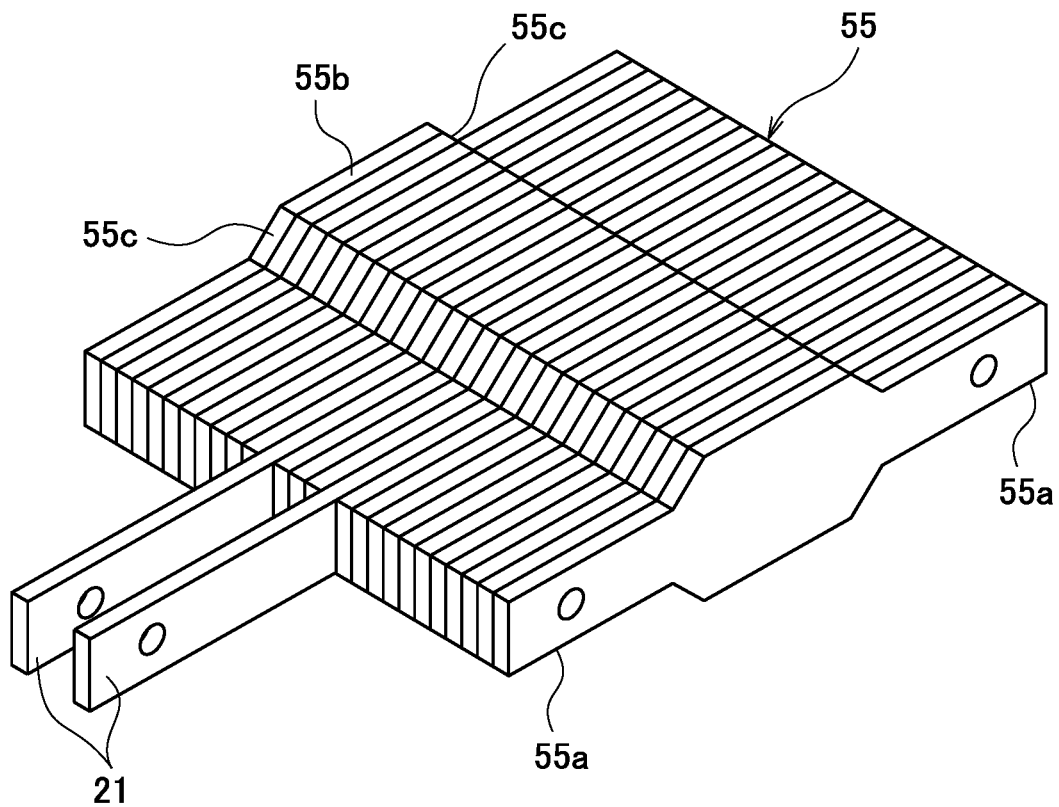
FIG. 9 is a perspective view illustrating a stack of piece-plates of a movable piece of the vibration generator.
Figure 10:
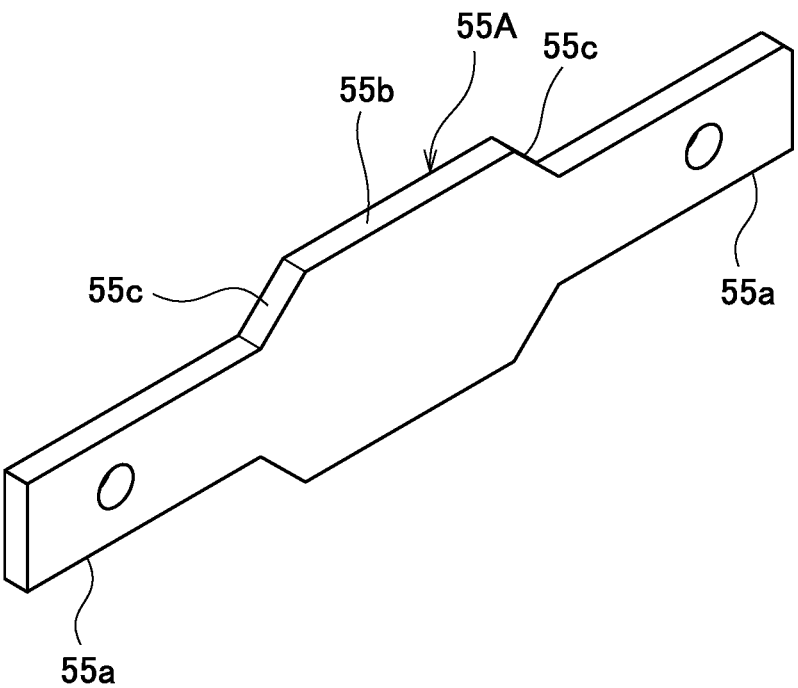
FIG. 10 is a perspective view illustrating a piece-plate.
Figure 11:
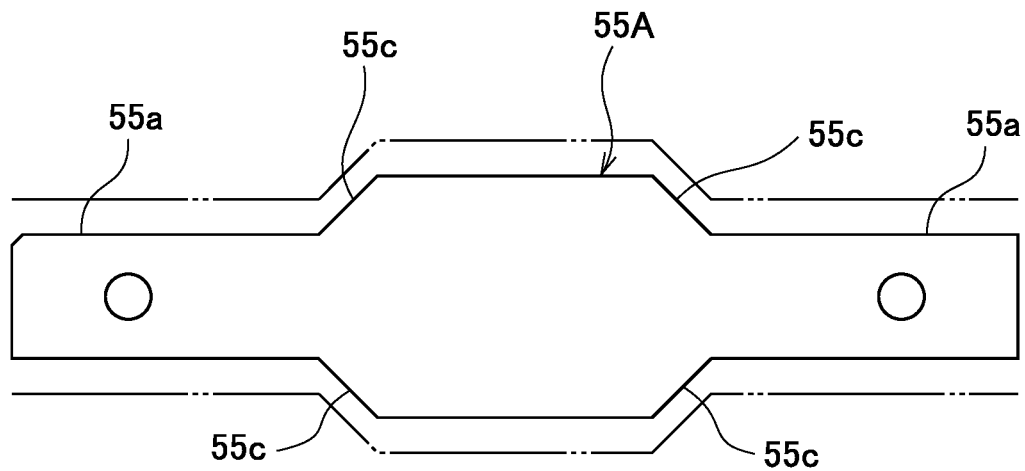
FIG. 11 is a front view illustrating the piece-plate.
Figure 12:
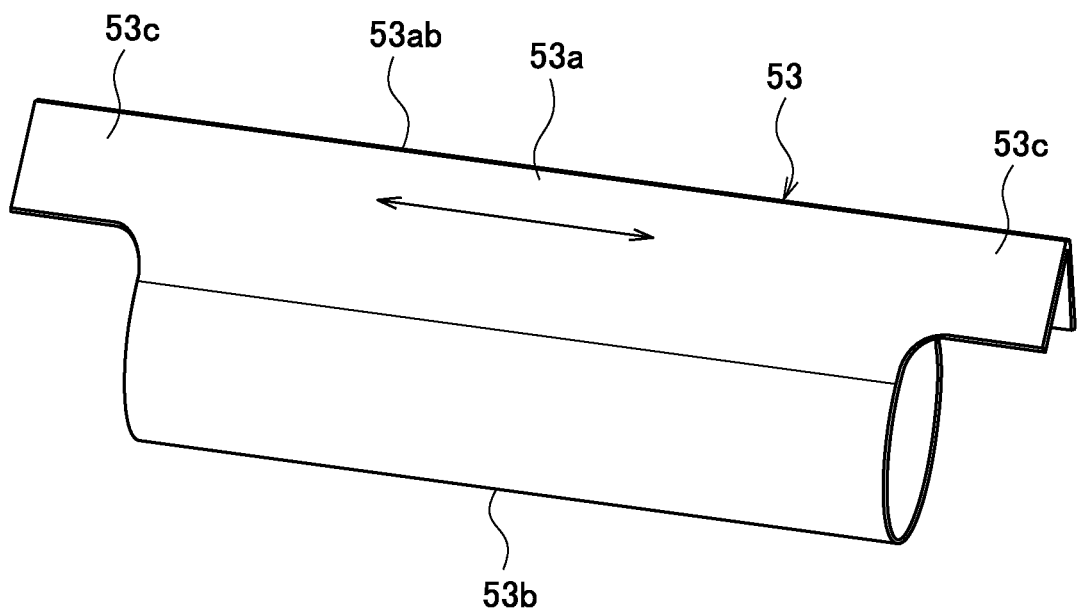
FIG. 12 is a perspective view illustrating a teardrop spring of the vibration generator.
Figure 13:
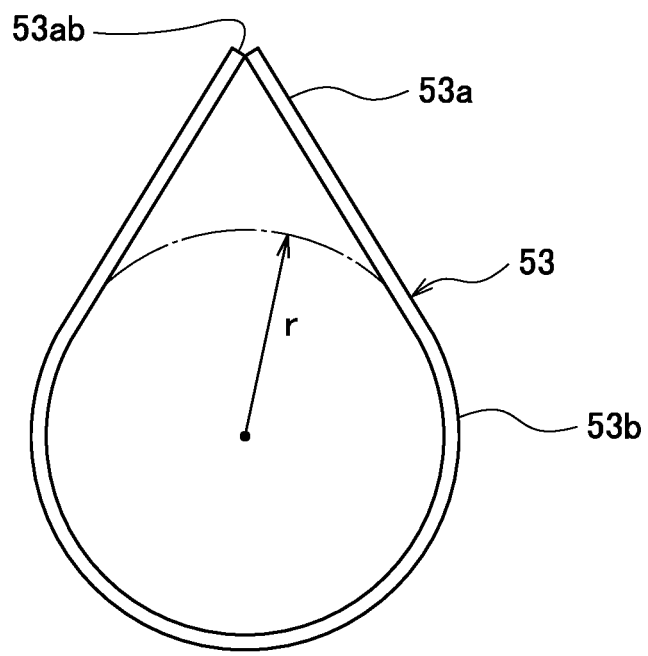
FIG. 13 is a sectional view illustrating the teardrop spring.
Figure 14:
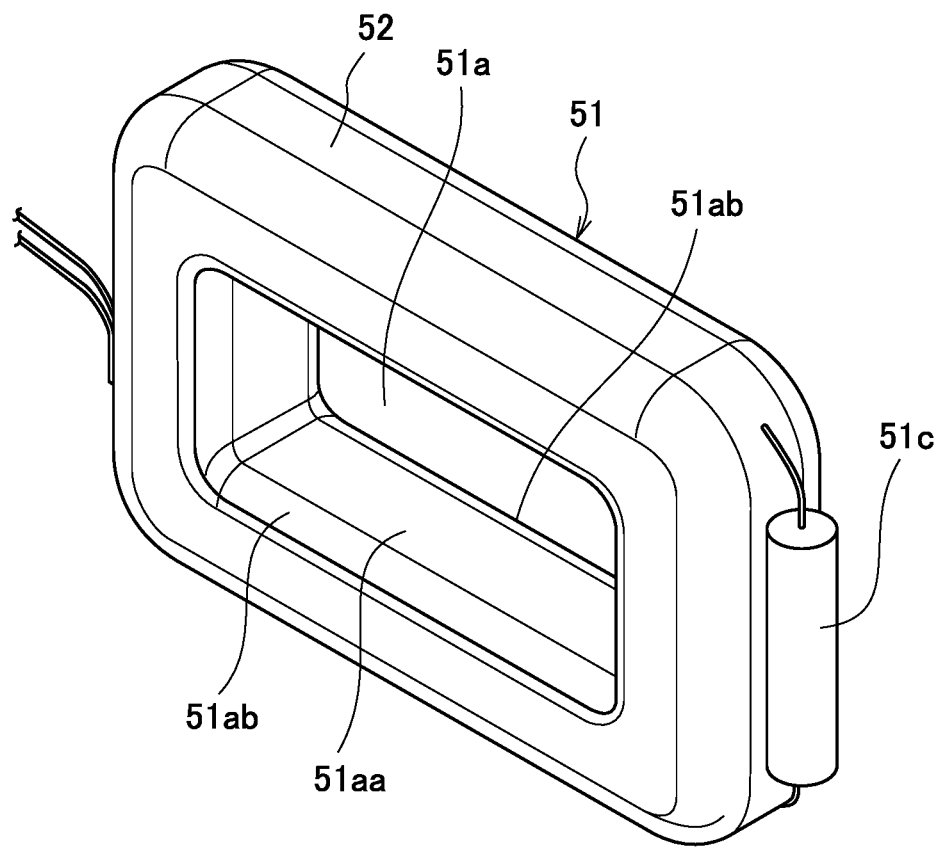
FIG. 14 is a perspective view illustrating a coil of the electromagnet.

FIGS. 3-5 are a perspective view, a side view and a front view each illustrating the vibration generator 19. FIG. 6 is a front view of a yoke 49 with an electromagnet 50 of the vibration generator 19. FIG. 7 is a perspective view illustrating a stack of yoke plates 49A of the yoke 49. FIG. 8 is a perspective view illustrating a yoke plate 49a. FIG. 9 is a perspective view illustrating a stack of piece-plates 55A of the movable piece 55 of the vibration generator 19. FIG. 10 is a perspective view illustrating a piece-plate 55A. FIG. 11 is a front view illustrating the piece-plate 55A. FIG. 12 is a perspective view illustrating a teardrop spring 53 of the vibration generator 19. FIG. 13 is a sectional view illustrating the teardrop spring 53. FIG. 14 is a perspective view illustrating the coil 51 of the electromagnet 50.

As illustrated in FIGS. 1-5, the vibration generator 19 includes a stationary permanent magnet 47, the yoke 49, the coil 51 and the movable piece 55. The movable piece 55 is supported with the yoke 49 through the four springs 53 and is configured to vibrate relatively to the yoke 49 according to the current applied to the coil 51 in the forward and backward directions. In this case, the permanent magnet 47, the yoke 49 and the coil 51 form a stationary side and the movable piece 55 forms a movable side which is movable to vibrate relatively to the stationary side.

As illustrated in FIGS. 4 and 6, the permanent magnet 47 includes, for example, three blocks 47a having a rectangular parallelepiped shape and vertically stacked one on another in series. The blocks of the permanent magnet may be arranged in parallel to be connected to the yoke 49.

As illustrated in FIGS. 3-8, the yoke 49 includes a pair of yoke upper and lower bodies 49a and 49b. The pair of the yoke upper and lower bodies 49a and 49b have stacked structures of yoke plates 49A, respectively. The pair of the yoke upper and lower bodies 49a and 49b form therebetween a magnet attaching portion 49c on a first side and form therebetween a piece arranging portion 49d and a coil fixing portion 49e on a second side.

The magnet attaching portion 49c is formed into a rectangular shape opened to outside on one side. The magnet attaching portion 49c is defined by an upper part and a lower part. The upper part of the magnet attaching portion 49c is formed by a first end 49f of the yoke upper body 49a and the lower part of the magnet attaching portion 49c is formed by a first end 49g of the yoke lower body 49b. The first end 49f of the yoke upper body 49a is connected to an upper pole, for example a north pole, of the permanent magnet 47 arranged in the magnet attaching portion 49c. The first end 49g of the yoke lower body 49b is connected to a lower pole, for example south pole, of the permanent magnet 47. Namely, the first ends 49f and 49g of the yoke upper and lower bodies 49a and 49b are connected to the respective north and the south poles of the permanent magnet 47.

The piece arranging portion 49d is formed between second ends of the yoke upper and lower bodies 49a and 49b. The piece arranging portion 49d is defined by an upper part and a lower part. A pair of projections 49h and 49i face each other and are respectively provided on the upper and the lower parts of the piece arranging portion 49d. Similarly, a pair of projections 49j and 49k face each other and are respectively provided on the upper and the lower parts of the piece arranging portion 49d. The pair of the projections 49h and 49i is paired with the pair of the projections 49j and 49k in the Y-axis direction. The number of the pairs of the projections is not limited to two and may be four or more so as to put the pairs symmetrically. Namely, the second ends of the yoke upper and lower bodies 49a and 49b which are the pair of the yoke bodies have symmetric two pairs of the projections 49h, 49i, 49j and 49k facing each other so as to form a pair of south and north poles in each pair of the projections 49h, 49i, 49j and 49k. In the drawings, the projections 49h and 49j of the yoke upper body 49a are north poles and the projections 49i and 49k of the yoke lower body 49b are south poles.

The yoke 49 has the coil fixing portion 49e in which the coil 51 is accommodated and fixed in the middle between the two pairs of the projections 49h, 49i, 49j and 49k. The coil fixing portion 49e is a hole formed into a vertically and bilaterally symmetrical shape and passes through the yoke 49 in the X-axis direction. The coil fixing portion 49e includes cutouts 49ea and 49eb. The cutout 49ea is formed downward on the second side of the yoke upper body 49a and the cutout 49eb is formed upward on the second side of the yoke lower body 49b. The cutouts 49ea and 49eb are respectively located on both sides of the piece arranging portion 49d in the vertical direction.

The yoke 49 has spring supports 57 at at least four positions so as to be symmetrically arranged according to the projections 49h, 49i, 49j and 49k. The spring supports 57 support the springs 53 on both sides of the coil fixing portion 49e in the Y-axis direction between the respective pairs of the projections 49h, 49i, 49j and 49k. The four spring supports 57 are formed into the same shape. The upper two spring supports 57 are inclined so as to be oriented toward a lower inside of the downward cutout 49ea. The lower two spring supports 57 are inclined so as to be oriented toward an upper inside of the upward cutout 49eb. Each spring support 57 is a cutout formed to have a triangular shape between a corresponding one of the projections 49h, 49i, 49j and 49k and the coil fixing portion 49e. The shape of the spring support 57 corresponds to a pointed end of the spring 53 (explained later). The spring support 57 is configured to tightly receive and support the pointed end of the spring 53 so as to be tightly fitted.

The permanent magnet 47 and the yoke 49 are held between a pair of brackets 59 and the brackets 59 are fastened by a bolt 61 and a nut 62. The pair of the brackets 59 have openings 59a to correspond to the coil fixing portion 49e. The openings 59a open the coil fixing portion 49e to the outside of the brackets 59. The brackets 59 have fastening portion 59b fastened to the float plate 33 of the engraving heat 11 being the stationary side.

The movable piece 55 is a stack of piece-plates 55A as illustrated in FIGS. 3-5 and 9-11. The stack as the movable piece 55 integrally has the arms 21 at a center on one end of the movable piece 55 in the Y-axis direction. The arms 21 locally or partly project from the movable piece 55. In FIG. 9, the arms 21 integrally project from the two piece-plates 55A in the center in the X-axis direction to output vibration.

The movable piece 55 has end portions 55a and a central portion 55b. The end portions 55a symmetrically laterally project from the both sides of the central portion 55b in the Y-axis direction. The end portions 55a of the movable piece 55 are arranged with first gaps t1 between the respective pairs of the projections 49h, 49i, 49j and 49k. The central portion 55b is expanded upward and downward with respect to the end portions 55a. The central portion 55b is located between the downward and upward cutouts 49ea and 49eb of the coil fixing portion 49e. The movable piece 55 also includes spring receiving portions 55c between the central portion 55b and the respective end portions 55a. The spring receiving portions 55c are inclined steps between the central portion 55b and the respective end portions 55a. The spring receiving portions 55c support arc-shaped portions of the springs 53, respectively.

At least four springs 53 are provided according to the spring supports 57. The number of the springs 53 may be increased as well as the number of the spring supports 57.

As illustrated in FIGS. 4 and 12-13, the springs 53 are formed by bending plate springs, so that each of the springs 53 has a symmetrical teardrop sectional shape. In the sectional shape, the spring 53 has the pointed end 53a on the first side and the arc-shaped portion 53b on the second side. The pointed end 53a is a butted portion at which the ends of the bent plate spring forming the spring 53 are butted to each other. The arc-shaped portion 53b has a curvature radius r and the ends of the bent plate spring project from an imaginary circle with the curvature radius r along tangential lines to form the pointed end 53a. A minimum distance between an apex 53ab of the pointed end 53 and the imaginary circle of the curvature radius r is smaller than the curvature radius r.

The pointed end 53a has a shape to be tightly fitted to the spring support 57. Both side faces of the pointed end 53a are brought into contact and supported with inner faces of the spring support 57. The arc-shaped portion 53b has the curvature to support the spring receiving portion 55c of the movable piece 55.

The spring 53 is interposed between the spring support 57 and the spring receiving portion 55c to have a line of symmetry inclined.

The spring 53 has side portions 53c of the pointed end 53a longitudinally projecting with respect to the arc-shaped portion 53b. The arc-shaped portion 53b is, therefore, accurately brought into contact with the spring receiving portion 55c while the pointed end 53a is accurately supported with the spring support 57.

In this way, the arc-shape portions 53b of the springs 53, which are supported with the spring supports 57, support the movable piece 55 to define the first gaps t1.

As illustrated in FIGS. 3-5 and 14, the coil 51 is wound in a rectangular shape. The winding shape is optional and the coil 51 may be wound so as to have an oval outer periphery or the like. A winding direction of the coil 51 is a direction orthogonal to an arranging direction along which the movable piece 55 is arranged. In the drawings, the up, down, right and left of the coil 51 are in the Z-axis and the X-axis directions. The coil 51 has a through-hole 51a inside the rectangular shape, the through-hole 51a in which the central portion 55b of the movable piece 55 is arranged. The through-hole 51a of the coil 51 has a precise flat plane at an inner periphery by winding a wire of the coil 51. The coil 51 is entirely coated with resin in this embodiment.

The resin coating 52 of the coil 51 forms the inner periphery of the coil 51 to define the through-hole 51a. The resin coating 52 has a planar inner peripheral face 51aa and rounded or chamfered edges Slab. The rounded or chamfered edges Slab are adjoining to the inner peripheral face 51aa to define openings of the through-hole 51a and face the arc-shaped portions 53b of the springs 53. This allows interspaces between the coil 51 and the respective springs 53 to be made narrow.

The shapes of the inner peripheral face 51aa and the rounded or chamfered edges Slab of the through hole 51a accurately define an oscillation range of the central portion 55b of the movable piece 55 and enable the arc-shaped portions 53b of the springs 53 to be accurately operated. Accordingly, second gaps t2 are formed between the central portion 55b of the movable piece 55 and the inner peripheral face 51aa of the through-hole 51a of the coil 51 so as to be minimized according to the size of the first gaps t1. At the same time, the coil 51 and the springs 53 are close to each other. The vibration generator 19 as a whole is, therefore, reduced in size.

A temperature sensor 51c is attached to the coil 51 to detect coil temperature during the operation. A signal of the detected temperature is input to the controller to control the temperature of the coil 51 during the operation.

The coil 51 is accommodated in the coil fixing portion 49e and is fixed to the yoke 49 at the outer periphery through resins P. According to the present embodiment, the resin P fixes between each of upper and lower ends and a corresponding portion of outer faces of the brackets 59. The coil 51 is, therefore, indirectly fixed to the yoke 49 in the present embodiment. The coil 51 may be, however, directly fixed to the coil fixing portion 49e of the yoke 49. In the embodiment in which the coil 51 is fixed to the outer faces of the brackets 59, the length of the coil 51 is larger than the length of the coil fixing portion 49e in the X-axis direction so that the ends of the coil 51 project outside the respective openings 59a of the brackets 59 in the X-axis direction. This easily fixes the coil 51 to the outer faces of the brackets 59 through the resins P.

As illustrated in FIG. 4, the central portion 55b of the movable piece 55 is arranged in the through-hole 51a with the second gaps t2, the second gaps t2 defined between the inner peripheral face 51aa of the through-hole 51a and the outer face of the central portion 55b. The second gaps t2 are evenly defined on the upper and the lower sides of the central portion 55b in the Z-axis direction between the central portion 55b and the inner peripheral face 51aa. The second gaps t2 have a size to allow oscillation, which is regulated by the first gaps t1, of the central portion 55b of the movable piece 55.

The central portion 55b of the movable piece 55 is oscillated and vibrated with the second gaps t2 when the end portions 55a of the movable piece 55 are vibrated with the first gaps t1 according to the current applied to the coil 51 in the forward and the backward directions, thereby to vibrate the movable piece 55 in the seesaw operation.

Before applying the current to the coil 51, the movable piece 55 is supported to the yoke 49 by the four springs 53 so as to be balanced. In this state, the end portions 55a maintain the first gaps t1 relative to the projections 49h, 49i, 49j and 49k of the yoke 49.

According to the current applied to the coil 51, both sides of the coil 51, in particular the end portions 55a of the movable piece 55, become the north and the south poles, respectively. When switching the direction of the current applied to the coil 51, the north and the south poles are reversed.

With the switching of the direction of the current, if the end portion 55a becomes the north pole, the end portion 55a repels the upper projection 49h or 49j being the north pole and the end portion 55a is attracted to the lower projection 49i or 49k being the south pole. If the end portion 55a becomes the south pole, the end portion 55a repels the lower projection 49i or 49k being the south pole and the end portion 55a is attracted to the upper projection 49h or 49j being the north pole.

Accordingly, the direction of the current applied to the coil 51 is switched to finely oscillate and vibrate the movable piece 55. The extent of the oscillation is controlled by the current. Namely, the extent of the oscillation of the movable piece 55 is varied within the first gaps t1 according to the current to control engraving depth.

At the time of the oscillation, the springs 53 receive load from the spring receiving portions 55c of the movable piece 55 to deform in the cross section. When releasing the load from the spring receiving portions 55c acting on the springs 53, the springs 53 push the spring receiving portions 55c while returning to the undeformed state in the cross section.

Even the small springs 53, therefore, accurately follow the fine oscillation of the movable piece 55.

Further, the central portion 55b of the movable piece 55 oscillates or vibrates in the through-hole 51a of the coil 51, so that the weight of the coil 51 does not affect the fine vibration of fine oscillation of the movable piece 55. The fine oscillation of the movable piece 55 is accurately performed. When the spring 53 deforms during the oscillation, the arc-shaped portion 53b deforms so as to be slightly collapsed. With this, the outer face of the arc-shaped portion 53b projects toward the coil 51. At this time, the rounded or chamfered edges Slab of the coil 51 allow the deformation of the spring 53 to make the movable piece 55 oscillate or vibrate naturally. Further, the spring 53 is arranged as close to the central portion 55b of the movable piece 55 as possible, so that the spring 53 accurately supports the movable piece 55 while the movable piece 55 oscillates accurately.

Further, the four springs 53 are symmetrically arranged so as to be inclined and the pushing forces of the springs 53 act evenly on the movable piece 55 through the arc-shaped portions 53b. The pushing forces of the springs 53 appropriately work on the fine oscillation.

The fine oscillation is transmitted to the support block 22 through the arms 21 and to the connecting member 23 from the support block 22, to vibrate the stylus 13 according to the engraving signal converted from the image data. This enables the stylus 13 to finely precisely engrave an image on the medium.

The second gaps t2 have the size to allow the oscillation, which is regulated by the first gaps t1, of the central portion 55b of the movable piece 55. This ensures the sufficient number of the windings or turns of the coil 51 while reducing the coil 51 in size as much as possible.

Figure 15:
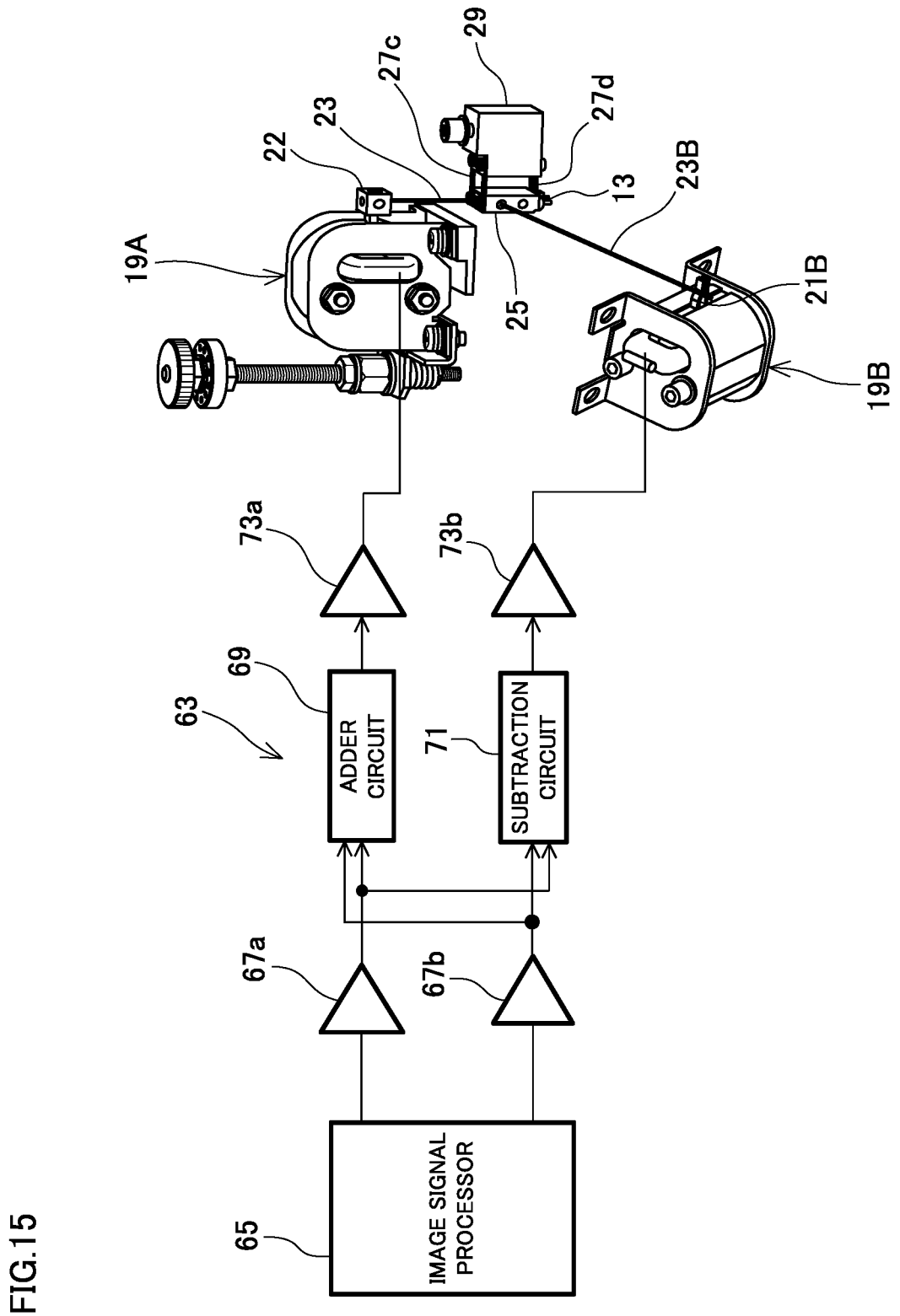
FIG. 15 is a conceptual diagram illustrating an apparatus for engraving an image having double vibration generators according to a second embodiment of the present invention.
Figure 16A:
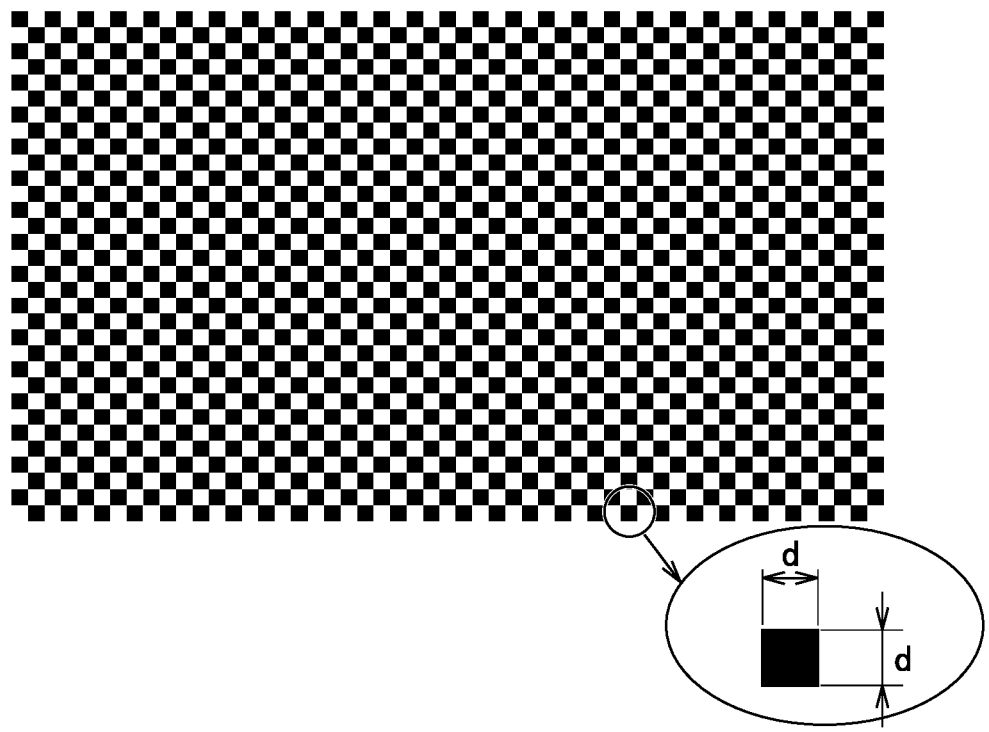
FIG. 16A is a schematic diagram illustrating resolution of an engraved image formed by the apparatus with the single vibration generator of the first embodiment.
Figure 16B:
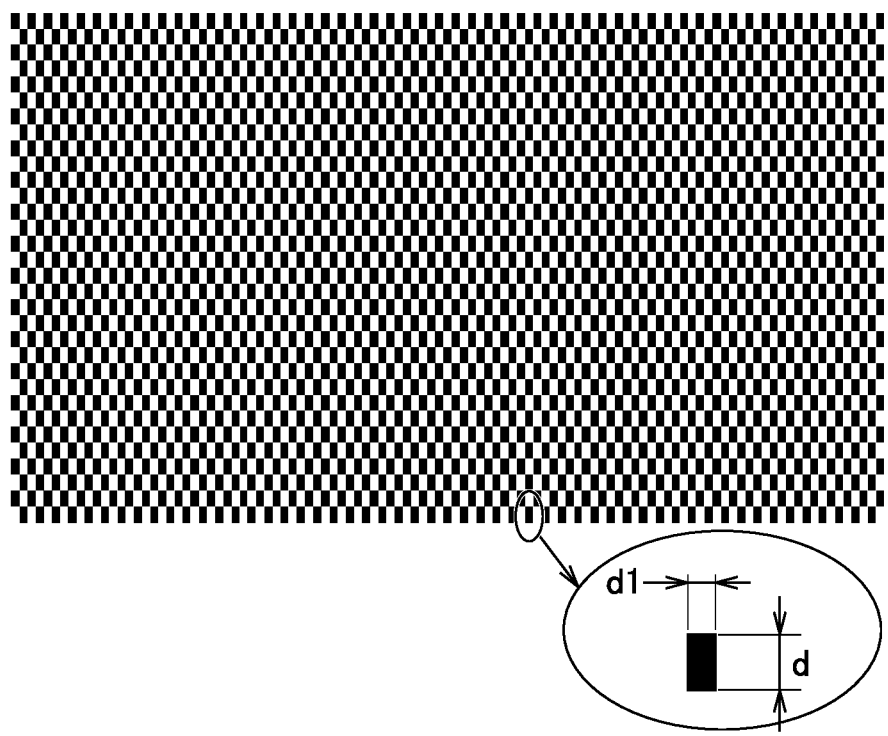
FIG. 16B is a schematic diagram illustrating resolution of an engraved image formed by the apparatus with the double vibration generators of the second embodiment.
Figure 17A:
FIG. 17A is a schematic diagram illustrating an engraved image formed by the apparatus with the single vibration generator of the first embodiment.
Figure 17B:
FIG. 17B is a schematic diagram illustrating an engraved image formed by the apparatus with the double vibration generators of the second embodiment.
Figure 18:
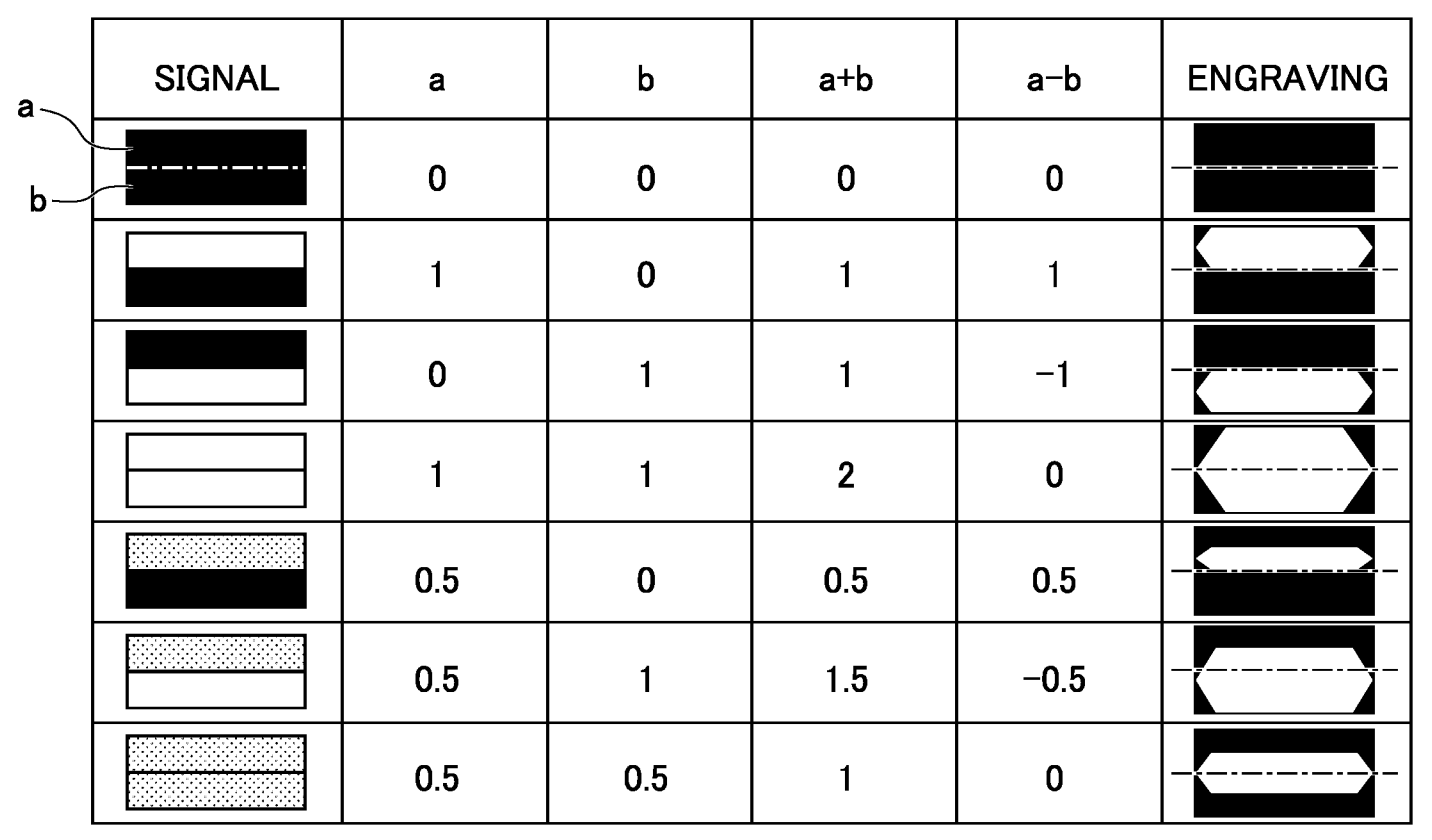
Figure 19A:
FIG. 19A is a table for explaining signal diagrams in FIG. 18.
Figure 19B:
FIG. 19B is a table for explaining engraved diagrams corresponding to the signal diagrams in FIG. 18.

FIG. 15 is a conceptual diagram illustrating an apparatus for engraving an image having double vibration generators according to the second embodiment of the present invention. FIG. 16A is a schematic diagram illustrating resolution of an engraved image formed by the apparatus with the single vibration generator of the first embodiment. FIG. 16B is a schematic diagram illustrating resolution of an engraved image formed by the apparatus with the double vibration generators of the second embodiment. FIG. 17A is a schematic diagram illustrating an engraved image formed by the apparatus with the single vibration generator of the first embodiment. FIG. 17B is a schematic diagram illustrating an engraved image formed by the apparatus with the double vibration generators of the second embodiment. FIG. 18 is a table illustrating assignment of signals of an adder circuit and a subtraction circuit. FIG. 19A is a table for explaining signal diagrams in FIG. 18. FIG. 19B is a table for explaining engraved diagrams corresponding to the signal diagrams in FIG. 18.

As illustrated in FIG. 15, the second embodiment is provided with two vibration generators 19A and 19B.

The vibration generator 19A is set to output vibration in the Z-axis direction. The additional vibration generator 19B is set to output vibration in a direction, for example the X-axis direction, orthogonal to the Z-axis direction.

The vibration generator 19A is the vibration generator 19 of the first embodiment and has the stylus holder 25 connected to the arms 21 through the connecting member 23 in the Z-axis direction. The stylus holder 25 is supported at front ends of support springs 27c and 27d allowing the stylus holder 25 to vibrate in the Z-axis and the X-axis directions. The support springs 27c and 27d are fixed at base ends to the fixing block 29 as a fixing portion. The support springs 27c and 27d are laterally extended toward the stylus holder 25 from the fixing block 29. The stylus holder 25 supports the stylus 13.

The support springs 27c and 27d are formed into a rod shape unlike the first embodiment to allow the vibration of the stylus holder 25 in the Z-axis and the X-axis directions.

The vibration generator 19B has arms 21B connected to the stylus holder 25 of the vibration generator 19A through a connecting member 23B in the X-axis direction. Namely, the vibration generator 19B has the same structure as the vibration generator 19A with the exception of the stylus holder 25. The connecting member 23B may be, however, varied in material, thickness and length according to the horizontal arrangement of the vibration generator 19B. The vibration generator 19B may be varied in shape, supporting structure and the like according to the horizontal arrangement.

The vibration generators 19A and 19B are connected to a drive circuit 63. The drive circuit 63 is conceptually illustrated in FIG. 15 illustrating a relation between an image signal processor 65 and the vibration generators 19A and 19B. The drive circuit 63 includes the image signal processor 65, a pair of amplifiers 67a and 67b, an adder circuit 69, a subtraction circuit 71 and amplifiers 73a and 73b. The image signal processor 65 is connected to the amplifiers 67a and 67b. The amplifiers 67a and 67b are connected to both the adder circuit 69 and the subtraction circuit 71. The adder circuit 69 is connected to the coil 51 of the vibration generator 19A through the amplifier 73a. The subtraction circuit 71 is connected to the coil 51 of the vibration generator 19B through the amplifier 73b.

Current is applied to the coils 51 of the vibration generators 19A and 19B according to engraving signal. The stylus 13 of the vibration generator 19A is vibrated in the Z-axis direction in conjunction with the vibration of the movable piece 55 in seesaw operation according to the engraving signal. Relative movement of the vibrating stylus 13 of the vibration generator 19A and the X-axis table 5 (object) is performed in the X-axis, the Y-axis and the Z-axis directions according to the engraving signal, thereby to engrave an image on the medium. To the engraving, the vibration generator 19B adds vibration to the stylus holder 25 in the X-axis direction based on the vibration of the movable piece 55 in seesaw operation according to the engraving signal.

With the double solenoid system being the apparatus 1 with the vibration generators 19A and 19B, the highly precisely engraving is performed.

The single solenoid system having the vibration generator 19A only obtains the resolution as illustrated in FIG. 16A. The double solenoid system having the vibration generators 19A and 19B obtains the resolution as illustrated in FIG. 16B. Namely, the resolution of the double solenoid system is twice as much as the resolution of the single solenoid system in the row direction.

Engraving a wording "World" using the single solenoid system, an engraved image is as illustrated in FIG. 17A. Engraving the wording "World" using the double solenoid system, an engraved image is as illustrated in FIG. 17B. The double solenoid system obtains the highly precisely engraved image by comparison with the single solenoid system.

A principle of the resolution of the double solenoid system is as follows.

When the single solenoid system is used, the stylus 13 engraves each dot in a target row while moving in the row direction of the target row without displacing in the column direction. Namely, the stylus 13 engraves the target row on a fixed line while varying engraving depth to express gradation.

Accordingly, density of a binary image is expressed at a center in the column direction of each dot even if the density in each dot is varied in the column direction. This limits on the resolution in the column direction.

On the other hand, the double solenoid system of the vibration generators 19A and 19B improves the resolution in the column direction. One example of engraving a black card will be explained with reference to FIGS. 18-19.

FIG. 18 illustrates a relation between engravings and signals in one dot. 0-1 are assigned to "a" and "b" in FIG. 18. The image data may have multi gradations such as 256 gradations. The column of "signal" in FIG. 18 indicates engravable minimum units of colors (black, gray and white). Any one of the minimum units is separately processed in each of upper and lower columns in one dot.

The column of "a" in FIG. 18 indicates a black and white level of the signal for the upper column in one dot. 0 is black and 1 is white. The column of "b" in FIG. 18 indicates a black and white level of the signal for the lower column in one dot. 0 is black and 1 is white. The column of "a+b" in FIG. 18 indicates engraving depth of the engraving in one dot. 0 is no engraving and 1 is the deepest. For the engraving depth, the vibration generator 19A is operated. The column of "a-b" in FIG. 18 indicates displacement of the engraving in one dot. 0 is a center, +1 is the uppermost and −1 is the lowermost. For the displacement, the vibration generator 19B is operated.

Engravings are, therefore, performed as illustrated in FIG. 19B according to signals of FIG. 19A. For example, if a signal is (0, 0) indicating black for each of the upper and the lower columns in one dot (the first column of the upper row in FIG. 19A), a command is (0, 0) indicating no engraving and no displacement (the first column of the upper row in FIG. 19B). If a signal is (1, 0) indicating white for the upper column and black for the lower column (the second column of the upper row in FIG. 19A), a command is (1, 1) indicating engraving depth being 1 and displacement being 1. Namely, the upper column of one dot is engraved with the engraving depth of 1 (the second column of the upper row in FIG. 19B). The same holds for the third column of the upper row and the first to third columns of the lower row of the FIGS. 19A and 19B.

In this way, the adder circuit 69 and the subtraction circuit 71 are operated to distribute commands according to the displacement of the density in each dot of the image data. With this, the vibration generators 19A and 19B are operated to control the position and the engraving depth of the stylus 13 in each dot. This improves the resolution in the column direction.

In addition, the stylus 13 may protrude to an adjoining dot in the column direction if the stylus 13 is displaced within each dot in the column direction. In this case, the displacement of the stylus 13 should be canceled to prevent the stylus 13 from protruding to the adjoining dot. Even if the displacement is not canceled, however, the protrusion of the stylus 13 to the adjoining dot may be ignored for accuracy of the engraved image.

What is claimed is:

1. A vibration generator, comprising:
a stationary permanent magnet;
a yoke for the permanent magnet;
a coil fixed to the yoke;
four springs provided to the yoke; and
a movable piece supported with the yoke through the four springs and configured to vibrate relatively to the yoke according to current applied to the coil in a forward and a backward direction, wherein
the yoke has a pair of yoke bodies with first ends and second ends, a coil fixing portion and four spring supports for the respective four springs, the first ends connected to respective south and north poles of the permanent magnet, the second ends having symmetric two pairs of projections facing each other to form a pair of south and north poles in each pair of the projections, the coil fixing portion into which the coil is accommodated and fixed in the middle between the two pairs of the projections, and springs of the four spring supports, on each side of the coil fixing portion, are symmetrically arranged between the coil fixing portion and a corresponding one of the two pairs of the projections to support respective corresponding springs of the four springs,
the movable piece has a central portion, end portions and an arm, the end portions symmetrically projecting from the central portion and arranged between the respective two pairs of the projections with first gaps, the central portion arranged in the coil fixing portion, and the arm projecting from one of the end portions to output vibration,
the springs have a teardrop sectional shape with a pointed end on a first side and an arc-shaped portion on a second side, the pointed ends of the springs supported with the respective spring supports, and the arc-shaped portions of the springs supporting the movable piece on both sides of the central portion, and
the coil in the coil fixing portion having an outer periphery and an inner periphery, the outer periphery fixed to the yoke through resin, the inner periphery having a through-hole in which the central portion of the movable piece is arranged with second gaps, the second gaps having a size to allow oscillation, which is regulated by the first gaps, of the central portion of the movable piece so that the central portion of the movable piece is oscillated and vibrated with the second gaps when the end portions of the movable piece are vibrated with the first gaps according to the current applied to the coil in the forward and the backward directions, thereby to vibrate the movable piece in seesaw operation.

2. The vibration generator according to claim 1, further comprising:
a resin coating forming the inner periphery of the coil to define the through-hole, the resin coating having a planar inner peripheral face and rounded or chamfered edges adjoining to the inner peripheral face to define openings of the through-hole, the rounded or chamfered edges facing the arc-shaped portions of the springs.

3. The vibration generator according to claim 1, further comprising:
a pair of brackets between which the permanent magnet and the yoke are held; and
openings formed on the pair of the brackets to face the coil fixing portion, wherein
the coil has side portions projected out from the respective openings of the brackets and is fixed on outer faces of the respective brackets through resin.

4. An apparatus for engraving an image having the vibration generator according to claim 1, comprising:
a stylus to engrave an image;
a stylus holder connected to the arm of the vibration generator and holding the stylus;
a support spring supporting the stylus holder to allow the stylus holder to be vibrated according to resiliency of the support spring;
a table configured to support a medium to be engraved and move in an X-axis direction, a Y-axis direction, and a Z-axis direction relatively to the stylus according to an engraving signal; and
a controller configured to control application of the current and relative movement of the table and the stylus, wherein
the vibration generator is set to output the vibration from the arm to vibrate the stylus holder in the Z-axis direction,
the support spring is arranged so as to be extended from a base end to a front end in a lateral direction, the base end fixed to a fixing portion and the front end at which the stylus holder is supported, and
the controller applies the current to the coil in the forward and the backward directions according to the engraving signal to vibrate the stylus in the Z-axis direction and causes the relative movement of the table and the vibrating stylus to move the vibrating stylus relatively to the medium supported on the table in the X-axis direction, the Y-axis direction, and the Z-axis direction, thereby to engrave an image on the medium to be engraved.

5. The apparatus for engraving an image according to claim 4, further comprising:
an additional vibration generator, the additional generator-being set to output vibration in the X-axis direction and comprising:
a stationary permanent magnet
a yoke for the permanent magnet
a coil fixed to the yoke;
four springs provided to the yoke; and
a movable piece supported with the yoke through the four springs and configured to vibrate relatively to the yoke according to current applied to the coil in a forward and a backward direction, wherein
the yoke has a pair of yoke bodies with first ends and second ends, a coil fixing portion and four spring supports for the respective four springs, the first ends connected to respective south and north poles of the permanent magnet, the second ends having symmetric two pairs of projections facing each other to form a pair of south and north poles in each pair of the projections, the coil fixing portion into which the coil is accommodated and fixed in the middle between the two pairs of the projections, and springs of the four spring supports, on each side of the coil fixing portion, are symmetrically arranged between the coil fixing portion and a corresponding one of the two pairs of the projections to support respective corresponding springs of the four springs,
the movable piece has a central portion, end portions and an arm, the end portions symmetrically projecting from the central portion and arranged between the respective two pairs of the projections with first gaps, the central portion arranged in the coil fixing portion, and the arm projecting from one of the end ortions to output vibration,
the springs have a teardrop sectional shape with a pointed end on a first side and an arc-shaped portion on a second side, the pointed ends of the springs supported with the respective spring supports, and the arc-shaped portions of the springs supporting the movable piece on both sides of the central portion, and
the coil in the coil fixing portion having an outer periphery and an inner periphery, the outer periphery fixed to the yoke through resin, the inner periphery having a through-hole in which the central portion of the movable piece is arranged with second gaps, the second gaps having a size to allow oscillation, which is regulated by the first gaps, of the central portion of the movable piece so that the central portion of the movable piece is oscillated and vibrated with the second gaps when the end portions of the movable piece are vibrated with the first gaps according to the current applied to the coil in the forward and the backward directions, thereby to vibrate the movable piece in seesaw operation, wherein
the stylus holder is connected to the arm of the additional vibration generator as well as the arm of the vibration generator,
the resiliency of the support spring is set to allow the stylus holder to vibrate in the X-axis and the Z-axis directions, and
the controller applies the current to the respective coils of the vibration generators in the forward and the backward directions according to the engraving signal to vibrate the stylus in the X-axis and the Z-axis directions and causes the relative movement of the table and the stylus to move the stylus relatively to the medium supported on the table in the X-axis direction, the Y-axis direction, and the Z-axis direction, thereby to engrave an image on the medium to be engraved.

6. The apparatus for engraving an image according to claim 4, wherein the vibration generator further comprises:
a resin coating forming the inner periphery of the coil to define the through-hole, the resin coating having a planar inner peripheral face and rounded or chamfered edges adjoining to the peripheral face to define openings of the through-hole, the rounded or chamfered edges facing the arc-shaped portions of the springs.

7. The apparatus for engraving an image according to claim 4, wherein the vibration generator further comprises:
a pair of brackets between which the permanent magnet and the yoke are held; and openings formed on the pair of the brackets to face the coil fixing portion, wherein the coil has side portions projected out of the respective openings of the brackets, and the coil is fixed on outer faces of the respective brackets through resin.

* * * * *